Patented Dec. 7, 1937

2,101,217

UNITED STATES PATENT OFFICE 2,101,217

PRODUCTION OF DICARBOXYLIC ACIDS AND ESTERS THEREOF

Julian W. Hill and Edgar W. Spanagel, Wilmington, Del., assignors to E. I. du Pont de Nemours & Company, Wilmington, Del., a corporation of Delaware No Drawing. Application January 29, 1935, Serial No. 3,956

15 Claims. (Cl. 260—106)

This invention relates to dicarboxylic acids and esters, more particularly to long chain dicarboxylic acids and esters, and a process for the production thereof.

It is an object of the invention to provide a new and improved process for the preparation of dicarboxylic acids and esters. A further object is to provide a simple and direct method for the preparation of dicarboxylic acid esters. An additional object is to provide a new and improved method of producing dicarboxylic acid esters by building up shorter carbon chain compounds. A more specific object is to provide a simple and direct method of forming esters of dibasic acids from dihalides having at least four carbon atoms less than the dibasic acid. Another object is the provision of a new and improved method of producing long chain dicarboxylic acids and esters having the acid and/or ester groups at the end of the chain. Other objects will appear hereinafter.

These objects are accomplished according to this invention by treating an alkali metal derivative of a beta-ketonic ester having the general formula (1) 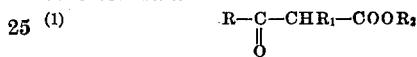

with a compound having the formula (2) $\quad X-R_3-X$ in which formulas R and $R_2$ represent the same or different hydrocarbon radicals such as, for example, alkyl, aryl, aralkyl, or alicyclic radicals, $R_1$ represents hydrogen or a radical of the type R, $R_3$ represents a divalent hydrocarbon radical containing at least two carbon atoms and in which the terminal carbon atoms are aliphatic in character and contain only univalent substituents, and X is a halogen atom such as chlorine, bromine or iodine.

This reaction gives a compound having the formula (3) 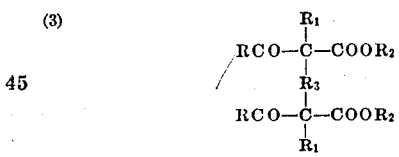

in which R, $R_1$, $R_2$ and $R_3$ have the same significance as before. This may be termed "Step 1."

In most cases, it is preferable not to isolate the product of Step 1. Instead, the crude reaction mixture is mixed with a metal alcoholate and an alcohol, and then heated. This reaction, which may be termed "Step 2", may be written as follows:

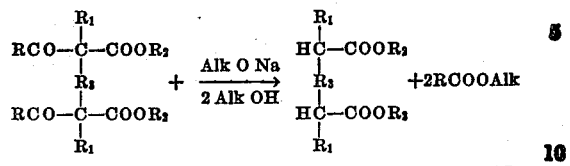

in which R, $R_1$, $R_2$ and $R_3$ have the same significance as before, and Alk denoted an aliphatic hydrocarbon radical as, for example, methyl, ethyl, propyl, butyl, etc.

In carrying out Step 1, the alkali metal derivative of the beta-ketonic ester is not ordinarily available as such but is formed in situ prior to the addition of the dihalogen compound. This alkali metal derivative, if isolated, would probably exist in the keto form with the formula

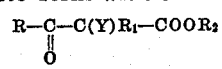

in which R, $R_1$ and $R_2$ have the same significance as before and Y represents the metallic radical as, for example, sodium or potassium. Since, however, this derivative may exist in the enol form, or as a mixture, we prefer to refer to it as an alkali metal derivative of a beta-ketonic ester of Formula (1).

The ester of the dibasic acid which constitutes the final product of Step 2 may be isolated by any convenient method, e. g., by distillation. If desired, it may be hydrolyzed to free acid by any suitable method.

The invention will be further illustrated, but is not limited, by the following examples.

*Example I*

Four and one-half (4.5) mols of acetoacetic ester were added to a solution of sodium ethylate prepared from 3 liters of dry alcohol and 96 grams of sodium in a five-liter, three-necked flask fitted with a dropping funnel, a good stirrer, and a reflux condenser, the upper end of which was protected by a calcium chloride tube. Two (2) mols (600 grams) of decamethylene dibromide were then added over a period of three hours, while stirring and refluxing the reaction mixture. Sodium bromide separated after about half of the halide had been added, but stirring and refluxing were continued for nine hours. The cooled solution was decanted from the sodium bromide and 1.5 liters of alcohol removed by distillation. Fifty-six (56) grams of sodium were added to the distillate which was then returned to the reaction mixture and further refluxed for forty hours. After distilling as much alcohol as possible, the ester was poured into a mixture of 1000 grams of ice and 200 cc. of concentrated hydrochloric acid. The product was extracted with benzene, washed twice with water, dried with calcium chloride and, after removal of the benzene, was distilled in vacuum. A yield of 378 grams (60%) of diethyl tetradecanedioate resulted, boiling at 160°–175°/1–2 mm.

Diethyl tetradecanedioate was identified by boiling point and the melting point of the dibasic acid, tetradecanedioic acid, obtained by hydrolysis of the ester.

In another run in which the solution was refluxed for twenty hours during the alcoholysis, a yield of 58% was obtained. Without refluxing a 38% yield resulted.

Diethyl tetradecanedioate has the formula $$C_2H_5-OOC-(CH_2)_{12}-COO-C_2H_5$$

The corresponding free acid, tetradecanedioic acid has the formula $$HOOC-(CH_2)_{12}-COOH$$

Example II

Diethyl heptadecanedioate can be prepared in the following manner:

Add 2 mols of acetoacetic ester to a solution of sodium ethylate prepared from 1.5 liters of dry alcohol and 46 grams of sodium in a three-liter, three-necked flask fitted with a dropping funnel, a good stirrer, and a reflux condenser, the upper end of which is protected by a calcium chloride tube. Then add 1 mol. of tridecamethylene dibromide over a period of three hours while stirring and refluxing the reaction mixture. Reaction is stopped after seven to nine hours. Alcoholysis of the resulting product is effected by refluxing the above alcohol solution with from 0.4 to 1.0 mol. equivalents of sodium ethylate for twenty hours. The diethyl heptadecanedioate can be isolated by distillation or any convenient method.

Diethyl heptadecanedioate has the formula $$C_2H_5-OOC-(CH_2)_{15}-COO-C_2H_5$$

and the corresponding acid obtained by hydrolysis has the formula $$HOOC-(CH_2)_{15}-COOH$$

Example III

In a manner similar to Example II, pimelic acid ester can be prepared by an alkylation of 2 mols acetoacetic ester with 1 mol. of trimethylene bromide and a subsequent alcoholysis as described in Example II.

Diethyl pimelate has the following general formula $$H_5C_2OOC-(CH_2)_5-COOC_2H_5$$

Example IV

The dimethyl ester of beta-methyl-adipic acid can be prepared in the following manner:

Add 2 mols of methyl-beta-keto valerate having the formula $CH_3CH_2-COCH_2COOCH_3$ to a solution of sodium methylate prepared from 1.5 liters of dry methanol and 46 grams of sodium in a three-liter, three-necked flask fitted with a dropping funnel, a stirrer and a reflux condenser, the upper end of which is protected by a calcium chloride tube. Then add 1 mol. of 1,2-dibrom-propane ($CH_3CHBrCH_2Br$) over a period of three hours, while stirring and refluxing the reaction mixture.

When reaction is complete, reflux the resultant alcohol solution with from 0.4 to 1.0 mol. equivalents of sodium methylate for twenty hours. The dimethyl ester of beta-methyl-adipic acid may be isolated in any suitable manner, e. g., by distillation.

The probable equations for the reactions involved are as follows:

(a) 
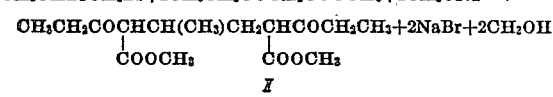

(b) 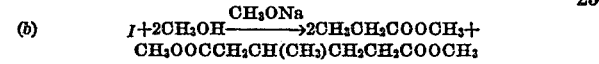

Example V

The preparation of para-di(beta-carbethoxyethyl)-benzene may be effected as follows:

To a solution of sodium ethylate prepared from 1.5 liters of dry ethyl alcohol and 46 grams of sodium in a three-liter, three-necked flask fitted with a dropping funnel, a stirrer and a reflux condenser, the upper end of which is protected by a calcium chloride tube, add 2 mols of acetoacetic ester. Then add 1 mol. of para-xylene dichloride ($p-C_6H_4(CH_2Cl)_2$) and reflux the resultant mixture with from 0.4 to 1.0 mol. equivalents of sodium ethylate for twenty hours. The di(beta-carbethoxyethyl)-benzene may be isolated in any suitable manner.

The probable course of reaction is as follows:

(a) 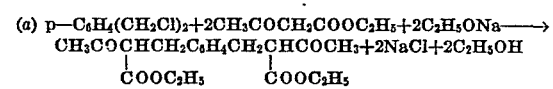

(b) 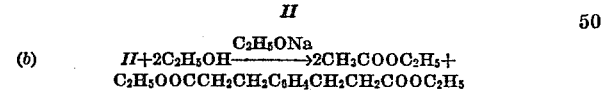

Example VI

By a method similar to that given in Example V, the diethyl ester of alpha,alpha'-diphenyl adipic acid can be prepared. This is effected by employing 2 mols of phenyl-acetoacetic ester ($CH_3COCH(C_6H_5)COOC_2H_5$) instead of the acetoacetic ester of Example V and 1 mol. of ethylene dibromide instead of the xylene dihalide.

The course of the reaction may be illustrated as follows:

(a) 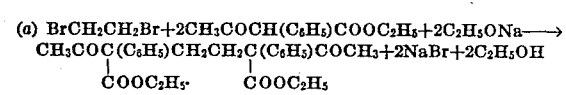

(b) 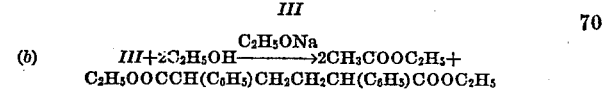

Similarly, a wide variety of dihalides may be employed in the process of the invention. Preferred types of dihalides are the polymethylene dihalides such as, for example, ethylene dibromide, hexamethylene dibromide and particularly the long chain compounds such as octamethylene dibromide, decamethylene dibromide, dodecamethylene dibromide, tridecamethylene dibromide, tetradecamethylene dibromide, and the corresponding chlorides and iodides, including also the unsaturated compounds having the same number of carbon atoms. One of the halogens may occupy a secondary position as in propylene bromide and 1,4-dibrompentane. Both of the halogens may occupy secondary positions as in 2,3-dibrombutane. Furthermore, a ring of any size may intercede between the aliphatic groups containing the halogens. Examples of these are the xylene dihalides and the hexahydroxylene dihalides. Finally, the halogens may be attached to a carbon in a ring as in 1,3-dibrom-cyclopentane.

In place of the acetoacetic ester employed in the examples, a wide variety of compounds may be used as defined in the general Formula (1). Typical examples are:

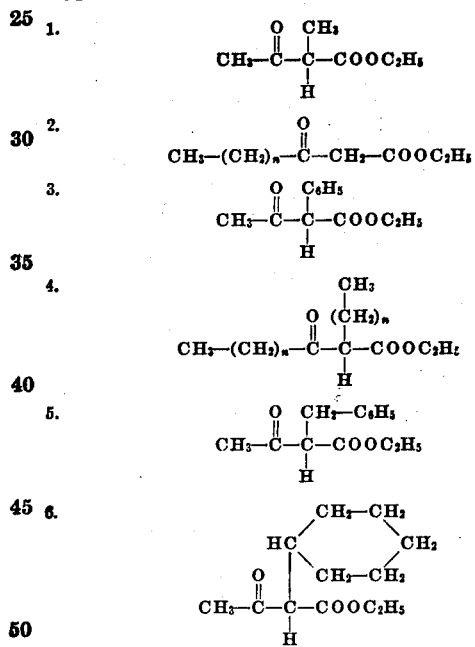

where $n$ is an integer.

The time required to complete the reaction to a given point depends on the temperature used and the compounds involved. The formation of the inorganic halide as a by-product in the first step is often an indication of the progress of the reaction. Thus, in Example I, in the operation involving the addition of the decamethylene dibromide, the quantity of sodium bromide which separates indicates how far the reaction has progressed.

In the second step, the metal alcoholate is preferably an alcoholate of an alkali metal such as sodium or potassium. Other metal alcoholates may be used, however, as, for example, those of aluminum or magnesium. The alcohol from which the alcoholate is formed normally corresponds to the terminal ester radical of the beta-ketonic acid ester. Typical alcohols for this purpose are methyl, ethyl, isopropyl, allyl, butyl, amyl, and higher aliphatic alcohols; also, alicyclic alcohols such as cyclohexanol, and aralkyl alcohols such as benzyl alcohol.

The amount of alcoholate is subject to wide variation, usually corresponding to that given in the equations for Step 1 and preferably varying within about 0.4 to 1.0 mol. equivalents per mol. of original dihalide for Step 2. Thus, in Example I, quantities of sodium ethylate varying from 0.4 to 1.0 mol. equivalents per mol. of original dibromide have been used in the alcoholysis, but the use of 0.6 mol. has given the highest conversion.

In the examples, the reactions are carried out at atmospheric pressure. Elevated temperatures and pressures may be employed to advantage in increasing the rate of reaction. The alcoholysis step (Step 2) in Example I, for instance, can be carried out in an autoclave at 150°–160° C. under the pressure developed by the reaction mixture.

The term "long chain" as herein employed refers to a carbon chain of at least eight carbon atoms.

The process of the invention is distinctly advantageous in that it provides a two-step method of producing esters of dicarboxylic acids by lengthening carbon chains as opposed to the much more involved processes at present available. The second step (or alcoholysis) is especially advantageous as applied to this type of reaction because it enables the direct production of the ester without going through the acid stage. The invention is particularly valuable in the production of "long chain" discarboxylic acids and esters, as, for example, those having carboxylic acid or ester groups in the terminal positions of a "long chain" polymethylene radical. Compounds of this type are usually very difficult to produce by other methods. A further advantage of the invention is that the raw materials used are, in general, more cheaply obtained than those employed in other processes.

The products of the invention are suitable for use as intermediates in the preparation of odorous compounds such as perfumes. Soluble salts of the "long chain" acids are also useful as wetting, dispersing and detergent agents, particularly those containing twelve to eighteen carbon atoms and having the carboxylate groups at the end of the chain.

As many apparently widely different embodiments of this invention may be made without departing from the spirit and scope thereof, it is to be understood that we do not limit ourselves to the specific embodiments thereof except as defined in the appended claims.

We claim:
1. In a process of producing dicarboxylic acids and esters, the steps which comprise treating an alkali metal derivative of a beta-ketonic ester of the general formula

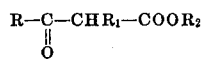

with a compound having the formula

in which R and $R_2$ represent hydrocarbon radicals, $R_1$ is a member of the group consisting of hydrogen and hydrocarbon radicals, $R_3$ represents a divalent hydrocarbon radical containing at least two carbon atoms and in which the terminal carbon atoms are aliphatic in character, and X is a member of the group consisting of chlorine, bromine and iodine, and then reacting the resultant reaction mixture with an alcohol and the corresponding metal alcoholate.

2. In a process of producing dicarboxylic acids and esters, the steps which comprise treating an alkali metal derivative of a beta-ketonic ester of the general formula

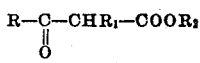

with a compound having the formula

X—R₃—X in which R and R₂ represent hydrocarbon radicals, R₁ is a member of the group consisting of hydrogen and hydrocarbon radicals, R₃ represents a divalent hydrocarbon radical containing at least two carbon atoms and in which the terminal carbon atoms are aliphatic in character, and X is a member of the group consisting of chlorine, bromine and iodine, and then reacting the resultant reaction mixture with an alcohol and the corresponding alkali metal alcoholate.

3. In a process of producing esters of dicarboxylic acids, the step which comprises heating a compound having the following formula

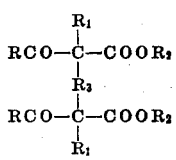

in which R and R₂ represent hydrocarbon radicals, R₁ is a member of the group consisting of hydrogen and hydrocarbon radicals, and R₃ represents a divalent hydrocarbon radical containing at least two carbon atoms and in which the terminal carbon atoms are aliphatic in character, with an alcohol and the corresponding metal alcoholate.

4. In a process of producing esters of dicarboxylic acids, the step which comprises heating a compound having the following formula

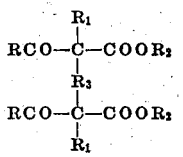

in which R and R₂ represent hydrocarbon radicals, R₁ is a member of the group consisting of hydrogen and hydrocarbon radicals, and R₃ is a polymethylene radical, with an alcohol and the corresponding metal alcoholate.

5. In a process of producing esters of dicarboxylic acids, the step which comprises heating a compound having the following formula

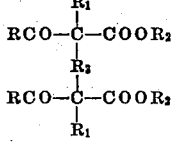

in which R and R₂ represent hydrocarbon radicals, R₁ is a member of the group consisting of hydrogen and hydrocarbon radicals, and R₃ is a polymethylene radical of at least eight carbon atoms, with an alcohol and the corresponding metal alcoholate.

6. In a process of producing alkyl esters of dicarboxylic acids, the steps which comprise treating an alkali metal acetoacetic acid alkyl ester with a polymethylene dihalide selected from the class consisting of polymethylene dichlorides, dibromides and di-iodides, and heating the resultant reaction mixture with an aliphatic alcohol and the corresponding alkali metal alcoholate.

7. In a process of producing alkyl esters of dicarboxylic acids, the steps which comprise treating an alkali metal acetoacetic acid alkyl ester with a polymethylene dibromide, and heating the resultant reaction mixture with an aliphatic alcohol and the corresponding alkali metal alcoholate.

8. In a process of producing aliphatic esters of tetradecanedioic acid, the step which comprises adding decamethylene dibromide to a sodium acetoacetic acid aliphatic ester, and heating the resultant reaction mixture with an aliphatic alcohol and the corresponding sodium alcoholate.

9. The process of preparing the diethyl ester of tetradecanedioic acid which comprises adding acetoacetic ester to a solution of sodium ethylate prepared from dry alcohol and sodium, then heating the mixture while adding thereto decamethylene dibromide, cooling the resultant solution, separating the sodium bromide formed, distilling a portion of the alcohol from said solution, adding sodium to the distillate, returning the resultant mixture of alcohol and sodium alcoholate, further heating the reaction mixture with said alcohol and sodium alcoholate, and separating the formed diethyl-tetradecanedioate.

10. In a process of producing aliphatic esters of heptadecanedioic acid, the steps which comprise adding tridecamethylene dibromide to a sodium acetoacetic acid aliphatic ester, and heating the resultant reaction mixture with an aliphatic alcohol and the corresponding sodium alcoholate.

11. The process of preparing the diethyl ester of heptadecanedioic acid which comprises adding acetoacetic ester to a solution of sodium ethylate prepared from dry alcohol and sodium, then heating the mixture while adding thereto tridecamethylene dibromide, cooling the resultant solution, separating the sodium bromide formed, distilling a portion of the alcohol from said solution, adding sodium to the distillate, returning the resultant mixture of alcohol and sodium alcoholate, further heating the reaction mixture with said alcohol and sodium alcoholate, and separating the formed diethyl-heptadecanedioate.

12. In a process of producing dicarboxylic acids and esters, the steps which comprise adding, to an alkali metal derivative of a beta-ketonic ester of the general formula

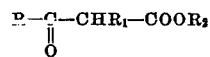

a compound having the formula

X—R₃—X in which R and R₂ represent hydrocarbon radicals, R₁ is a member of the group consisting of hydrogen and hydrocarbon radicals, R₃ represents a divalent hydrocarbon radical containing at least two carbon atoms and in which the terminal carbon atoms are aliphatic in character, and X is a member of the group consisting of chlorine, bromine and iodine, and then reacting the resultant reaction mixture with an alcohol and the corresponding metal alcoholate.

13. In a process of producing dicarboxylic acids and esters, the steps which comprise adding, to an alkali metal derivative of a beta-ketonic ester of the general formula

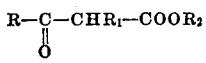

a compound having the formula

in which R and R$_2$ represent hydrocarbon radicals, R$_1$ is a member of the group consisting of hydrogen and hydrocarbon radicals, R$_3$ represents a divalent hydrocarbon radical containing at least two carbon atoms and in which the terminal carbon atoms are aliphatic in character, and X is a member of the group consisting of chlorine, bromine and iodine, and then reacting the resultant reaction mixture with an alcohol and the corresponding alkali metal alcoholate.

14. In a process of producing alkyl esters of dicarboxylic acids, the steps which comprise adding, to an alkali metal derivative of an acetoacetic acid alkyl ester, a polymethylene dihalide selected from the class consisting of polymethylene dichlorides, dibromides and di-iodides, and heating the resultant reaction mixture with an aliphatic alcohol and the corresponding alkali metal alcoholate.

15. In a process of producing alkyl esters of dicarboxylic acids, the steps which comprise adding, to an alkali metal derivative of an acetoacetic acid alkyl ester, a polymethylene dibromide, and heating the resultant reaction mixture with an aliphatic alcohol and the corresponding alkali metal alcoholate.

JULIAN W. HILL.
EDGAR W. SPANAGEL.